United States Patent [19]

Dhein et al.

[11] Patent Number: 4,762,901

[45] Date of Patent: Aug. 9, 1988

[54] PROCESS FOR THE PREPARATION OF POLYMERIC NETWORKS HAVING SUPERSTRUCTURES, CORRESPONDING POLYMERIC NETWORKS AND THE USE THEREOF

[75] Inventors: Rolf Dhein, Krefeld; Hanns P. Müller, Odenthal; Helmut-Martin Meier, Ratingen; Roland Gipp, Cologne, all of Fed. Rep. of Germany

[73] Assignee: Bayer Aktiengesellschaft, Leverkusen, Fed. Rep. of Germany

[21] Appl. No.: 64,672

[22] Filed: Jun. 22, 1987

[30] Foreign Application Priority Data

Jul. 5, 1986 [DE] Fed. Rep. of Germany ....... 3622613

[51] Int. Cl.$^4$ .............................................. C08G 18/38
[52] U.S. Cl. ........................................ 528/73; 528/76; 528/77; 528/100; 528/105; 528/107; 528/272; 528/308.6

[58] Field of Search .................... 528/73, 76, 77, 100, 528/105, 106, 107, 272, 308.6

[56] References Cited

U.S. PATENT DOCUMENTS 4,600,764  7/1986  Dicke et al. ..................... 528/126

Primary Examiner—Maurice J. Welsh
Attorney, Agent, or Firm—Connolly and Hutz

[57] ABSTRACT

A process is described for the preparation of polymeric networks having superstructures, resulting from the use of liquid-crystalline, (poly)functional units, characterized in that build-up into polymers is carried out by the polymerization, polyaddition or polycondensation process within the liquid-crystalline, preferably nematic, temperature range of the (poly)functional units, having a liquid-crystalline character, used for building up the networks.

Polymeric networks which are accessible by this process, and the use thereof, are also claimed.

9 Claims, No Drawings

PROCESS FOR THE PREPARATION OF POLYMERIC NETWORKS HAVING SUPERSTRUCTURES, CORRESPONDING POLYMERIC NETWORKS AND THE USE THEREOF

A process is described for the preparation of polymeric networks having superstructures, resulting from the use of liquid-crystalline, (poly)functional units, characterized in that build-up into polymers is carried out by the polymerization, polyaddition or polycondensation process within the liquid-crystalline, preferably nematic, temperature range of the (poly)functional units, having a liquid-crystalline character, used for building up the networks.

Polymeric networks which are accessible by this process, and the use thereof, are also claimed.

Liquid-crystalline (LC) polymers have recently been described by many authors. A summary of the theory, synthesis, characterization, structure/property relationship and uses of LC polymers is contained in the monograph by L. LAWRENCE CHAPOY, Recent advances in liquid crystalline polymers, Elsevier Applied Science Publishers LTD (1985), London, New York.

All the LC polymers described therein have one common structural feature: they have a linear structure and contain liquid-crystalline polymer units in the main and side chain. The LC polymers described exhibit a lyotropic or thermotropic behaviour. Typical for these linear LC polymers are their mechanical properties, which are markedly direction-dependent.

New research results make it clear that, in the case of chain molecules in which at least some units are present in conformative disarray, the formation of a nematic phase is accompanied by a significant change in the conformation. This change contributes to the relatively great stability of the nematic phase and can be reflected in relatively high transition temperatures (cf. FLORY, in L.L. CHAPOY, page 101).

In liquid-crystalline compounds, a differentiation is made between at least three characteristic phases which can be observed by polarized-light microscopy, the smectic phase, the nematic phase and the cholesteric phase (R. Steinsträsser, L. Pohl, Angew.-Chem. 85 (1973), 706). A list of the liquid crystals synthesized hitherto is contained, for example, in the book by D. Demus and H. Zaschke "Flüssige Kristalle in Tabellen II" [Liquid crystals in Tables II], VEB, Deutscher Verlag für Grundstoffindustrie, Leipzig, 1984.

Polymeric networks having particular superstructures were hitherto not known.

The present invention therefore has the object of making available polymeric networks which have a higher order and which, through particular superstructures, have improved properties in the final products and which contribute to a relatively great stability of the networks formed without a distinct directional dependency of the properties being present.

It was possible to achieve this object by the build-up principle, according to the invention and described below in greater detail, of three-dimensional polymers having particular superstructures and by the process, according to the invention, which is suitable for their preparation.

It has namely been found, surprisingly, that polymeric networks having particular superstructures or having a higher order can be prepared industrially by carrying out, according to the invention, the build-up of the polymers by polyaddition or polymerization or polycondensation in the liquid-crystalline temperature range, preferably in the nematic range, of the particular polyfunctional units used for the build-up. The particular units are liquid-crystalline units, for polymers, which are capable of crosslinking and which carry functional groups.

This finding is so surprising, and could not be predicted by those skilled in the art, since the liquid-crystalline units used for building up the polymeric networks with superstructures are changed chemically by the crosslinking reaction, and a significant change in the nematic phases must have been expected due to this chemical change during build-up of the networks.

Surprisingly, this is not the case. The new principle permits polymeric networks having superstructures to be built up by polyaddition or polymerization or polycondensation in a process in which the (poly)functional units having a liquid-crystalline character and used for building up the networks are reacted, in the liquid-crystalline temperature range, preferably in the nematic range, if appropriate with (poly)functional units likewise having a liquid-crystalline character, or alternatively with (poly)functional units without a liquid-crystalline character. Finally, it is also passible to obtain polymeric networks having superstructures when polyfunctional units are employed as LC precursors, the polymeric network having a LC character not being produced until the networks are built up. All the building-up reactions mentioned lead to polymers having improved properties.

Accordingly, the present invention relates to polymeric networks having superstructures, characterized in that (a) functional units having a liquid-crystalline character, preferably polyfunctional units, are, if appropriate, reacted with (b) functional, preferably polyfunctional, units, with or without a liquid-crystalline character, by the polyaddition, polycondensation or polymerization processes within the liquid-crystalline, preferably within the nematic, temperature range of the (poly)functional units having a liquid-crystalline character and used for building up the polymeric networks with build-up to form the polymer, and, if appropriate, are post-cured at temperatures outside the liquid-crystalline region.

In particular, the present invention relates to polymeric networks having superstructures, characterized in that they are polyaddition plastics produced by the diisocyanate polyaddition process; the invention also relates to corresponding processes for the preparation thereof.

In particular, the invention also relates to polymeric networks having superstructures, characterized in that they are polyaddition plastics of the epoxy resin type; the invention also relates to corresponding processes for the preparation thereof.

In particular, the invention also relates to polymeric networks having superstructures, characterized in that they are polymerization plastics of the unsaturated polyester resin type; the invention also relates to corresponding processes for the preparation thereof.

The invention furthermore relates to polymeric networks having superstructures, characterized in that they are polycondensation plastics of the melamin resin or phenone resin type, and to corresponding processes for the preparation thereof.

The invention finally relates to the use of polymers, having superstructures, obtained by polyaddition, polymerization or polycondensation reactions as polymeric materials having improved properties and as coating agents.

Suitable starting materials for the preparation, by the process according to the invention, of polymeric networks having superstructures are functional units (a) and/or (b) which are suitable for building up polymers having a spatial network. These are, for example, compounds carrying at least two functional groups, such as OH, NH₂, COOH or NCO groups, and which make chain growth in addition or condensation reactions possible.

In the case of polymerization reactions with polymerizable groups, for example ethylenically unsaturated groups or epoxide groups, chain growth can also be achieved with only one double bond or epoxide group.

However, it is always necessary to use or co-use, as functional units, only those compounds which produce spatial crosslinking (more than difunctional, merely chain-forming reactions). In conventional polyaddition or polycondensation reactions, these are, for example, trifunctional or polyfunctional units.

However, in suitable polymerization addition reactions, crosslinking bridges can also be produced from only two reactive groups, for example by reaction of a carbodiimide group and a carboxyl group, or difunctional compounds lead to spatially crosslinked polymers, for example diisocyanates through trimerization reactions.

Compounds having, for example, two ethylenically unsaturated groups or two epoxide groups lead to branches and spatially crosslinked polymerizations in polymerization reactions.

Polymeric networks can also be achieved from functional units by crosslinking of linear polymers, for example through diisocyanates or peroxides (while complying with the temperature range to be maintained according to the invention for the liquid-crystalline units).

However, build-up via functional units, in particular type (a)+(b), is preferred. In certain cases, however, polymeric networks can also be produced from only one liquid-crystalline unit (a), for example from UP resins which contain several unsaturated double bonds and which are capable of being converted into spatial polymer networks in the polymerization reaction.

Besides liquid-crystalline units (a), non-liquid-crystalline units of conventional construction (b) can also be used. In most cases, this is even preferred over the use of liquid-crystalline units both in (a) and in (b).

Functional units without a liquid-crystalline character which can be employed are, in principle, all (poly)-functional starting materials which are known for conventional polyaddition reactions, polycondensation reactions or polymerization reactions. These are, for example, conventional monomers having unsaturated double bonds, or difunctional or polyfunctional diols/polyols, diamines/polyamines, dicarboxylic acids/polycarboxylic acids, aminocarboxylic acids, diisocyanates/polyisocyanates and many other starting materials, known per se, having functional groups. A number of such units (b) are shown as examples in the more detailed characterization of the polymeric network-forming reactions.

The liquid-crystalline starting compounds mentioned can be employed as such or in already oligomeric or lower polymeric, non-crosslinked form (for example in precondensates).

For the preparation, by the process according to the invention, of polymeric networks having superstructures, suitable liquid-crystalline starting materials (a), if appropriate also (b), are compounds which correspond to the general formula (I)

$$R_1-(A_1)_m-Z_1-A_2-Z_2-(A_3)_n-R_2 \qquad (I)$$

where
$R_1$ and $R_2$ denote

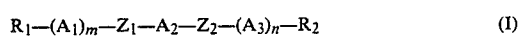

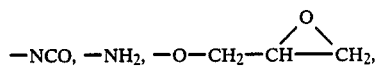

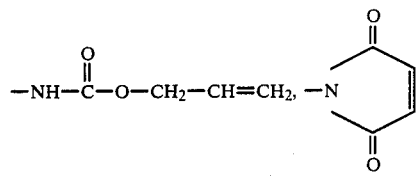

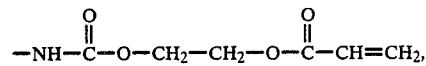

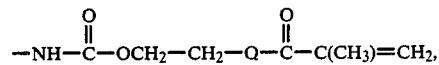

—L—(CH₂)ₓOH, —L—(CH₂)ₓ—CO₂h, L=O, S, a direct bond, —(CH₂)ₓ—OH or —(CH₂)ₓ—CO₂H, x≧1, A₁, A₂ and A₃ denote 1,4-phenylene, 4,4'-diphenyl, 4,4'-(1,2,3,4,5,6-hexahydro)-diphenyl, 1,4-cyclohexylene, 1,3-dioxane-2,5-diyl, piperidine-1,4-diyl, piperazine-1,4-diyl, 1,4-bicyclo-(2,2,2)-octylene, pyrimidine-2,5-diyl, or 2,7- or 2,6-naphthylene groups, where A₁-A₃ can be substituted by 1, 2, 3 or 4 F atoms or lower alkyl groups, preferably methyl, or 1 or 2 substituents from the series comprising Cl, Br, —CN or —CF₃; Z₁ and Z₂ denote —CO—O—, —O—CO—, —HC=CH—, —N=N—, —CH=N—, —CH₂CH₂—, —OCH₂, —CH₂O—, —CH₂S—, —SCH₂—, —O—CO—O—, —O—CO—NH—, —NH—CO—O—, —CH₂—O—CO—NH—, —NH—CO—O—CH₂—, —NH—CO—S—CH₂, —CH₂—S—CO—NH—, —CH₂—O—CO—, —NH—CO—S—, —S—CO—NH—, —CO—S—, —CO—SCH₂—, CH₂—S—CO—, —S—CO—, —CO—O—CH₂— or a direct bond, where one of the groups Z₁ and Z₂ can be missing, n denotes 0 or 1, and m denotes 1 or 2, where, in the case where m is 2, the two groups A₁ may be identical or different.

Examples of suitable liquid-crystalline compounds are further

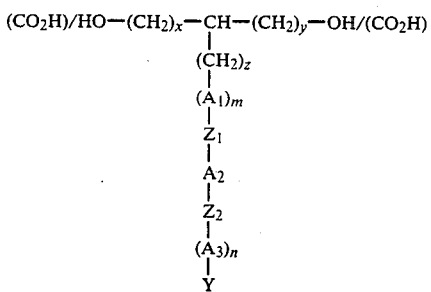

$$(CO_2H)/HO-(CH_2)_x-CH-(CH_2)_y-OH/(CO_2H) \quad (IA)$$

where
x, y and z ≧ 1, and where
$A_1$, $A_2$, $A_3$, $Z_1$, $Z_2$, m and n correspond to the above-mentioned meanings and Y denotes H or $R_1$.

For the preparation of polymeric networks having superstructures, the diisocyanate polyaddition process in the broad sense can be used. Preferred liquid-crystalline (LC) units are polyisocyanates of the formula (II)

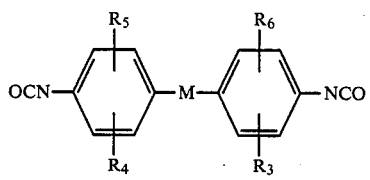

where
M represents —HC=CH—, —N=N—, —CH=N—, —COO— or —CH$_2$—CH$_2$— and
$R_3$ to $R_6$ represent hydrogen or saturated aliphatic substituents, having 1 to 12 C atoms, which are optionally interrupted by ether oxygen atoms, or represent F, Cl, Br, —CN or —CF$_3$; the industrially easily accessible diisocyanate (III), whose liquid-crystalline character has only just been discovered, is very particularly preferred.

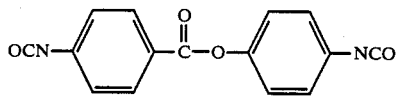

Diisocyanates of the aromatic ester type (III) were disclosed long ago by DE-B No. 1,085,869.

It has now been found that the diisocyanates described in DE-B No. 1,085,869 have a distinct nematic phase. A quantitative differential thermoanalysis (DTA) measurement on compound (III) showed, on heating with melting, a solid→nematic transition at 117.2° C. and a nematic→isotropic liquid transition at 172.6° C. On cooling the melt, the isotropic liquid→nematic transition occurs at 172° C. and the nematic→solid transition at 102° C.

Quantitative polarized-light microscopic measurements also show these phase transitions.
Heating:
solid→nematic transition, 117.5° C.
nematic→isotropic liquid transition, 172.1° C.
Cooling:
isotropic liquid→nematic transition, 172.5° C.
nematic→solid, 101.1° C.

However, for the preparation of polymeric networks having superstructures, blends of the liquid-crystalline diisocyanates according to formulae (I), especially (II) and in particular (III), with conventional, aliphatic, cycloaliphatic, araliphatic and aromatic or heterocyclic polyisocyanates, or any mixtures thereof, are also suitable, for example diisocyanates and/or polyisocyanates as described by W. Siefken in Justus Liebigs Annalen der Chemie, 562, pages 75-136, or those polyisocyanates described in detail in DE-A No. 2,832,253. Particularly preferred are the industrially easily accessible polyisocyanates, for example 2,4- and/or 2,6-toluylene diisocyanate, and any mixtures of these isomers (TDI), the 4,4'- and/or 2,4'- and/or 2,2'-isomers of diphenylmethane diisocyanate, polyphenyl-polymethylene polyisocyanates as are prepared by aniline/formaldehyde condensation and subsequent phosgenation ("crude MDI"), and "modified polyisocyanates", such as, for example, carbodiimide groups, urethane groups, allophonate groups, isocyanurate groups, urea groups and/or biuret groups, in particular those modified polyisocyanates which are derived from 2,4- and/or 2,6-toluylene diisocyanate or from 4,4'- and/or 2,4'-diphenylmethane diisocyanate. Aliphatic diisocyanates, for example hexamethylene diisocyanate, dicyclohexylmethane 4,4'-diisocyanate, cyclohexane 1,4-diisocyanate or biuretized polyisocyanates, derived from the above diisocyanates or from isophorone diisocyanate, and trimers of the diisocyanates mentioned are also suitable.

Suitable starting components are furthermore compounds having at least two hydrogen atoms which are reactive towards isocyanates and having a molecular weight from 400 to 10,000. Besides compounds having amino, thiol and/or carboxyl groups, these are preferably taken to include compounds having hydroxyl groups, in particular 2 to 8 hydroxyl groups, specifically those having a molecular weight from 800 to 6,000, but preferably polyesters, polyethers, polythioethers, polyacetals, polycarbonates and polyester amides in each case having 2 to 4 hydroxyl groups, as are known per se for the preparation of homogeneous or cellular polyurethanes and are described, for example, in DE-A No. 2,832,253, pages 11-18. Particularly preferred are polyethers which are obtained by addition of one or more alkylene oxides (ethylene oxide and, particularly, propylene oxide) and dihydric or polyhydric "starters" (for example propylene glycol, glycerol, sorbitol, formose, triethanolamine, trimethylolpropane and others, and also polyethers which contain, dispersed or dissolved, polyaddition products of diisocyanates of hydrazine and/or diamines and/or glycols, or polymers and/or graft polymers, preferably of styrene and acrylonitrile. Further suitable are polyesters, including polycarbonates, as are usually used as soft segment. The preferred relatively high-molecular weight compounds of this type generally have melting points below 60°, preferably below 45° C. Preferably, relatively high-molecular weight compounds, having hydroxyl groups and having a functionality, at least partially, are used which have functionalities of greater than 2 when no further, more than bifunctional starting units are used in the polyaddition reaction or when the reaction is carried out under crosslinking conditions.

If appropriate, compounds having at least two hydrogen atoms which are reactive towards isocyanates and having a molecular weight of 32 to 399 can be used as starting components. In this case also, these are taken to mean compounds which contain hydroxyl groups and/or amino groups and/or thiol groups and/or carboxyl groups and/or hydrazide groups and which serve as chain-extending agents or crosslinking agents. These compounds generally have 2 to 8, preferably 2 to 4, hydrogen atoms which are reactive towards isocyanates. Examples of these are described in DE-A No. 2,832,253 (pages 19–20). Examples which may be mentioned are water, ethylene glycol, butane-1,4-diol, 2,2-dimethylpropanediol, trimethylolpropane, formite mixtures, hydrazine, ethylenediamine, 3,3'-dimethyl-4,4'-diaminodicyclohexylmethane, 3,5-diethyl-2,4- (and/or 2,6)-diaminotoluene or adipodihydrazide.

In the reactions, auxiliaries and additives of a conventional type, for example water, catalysts, surface-active additives, reaction retarders, plasticizers or fungistatically or bacteriostatically active substances, stabilizers and light-protection agents, such as fillers, such as barium sulphate, kieselguhr, carbon black, whiting, glass fibres, carbon fibres and aramide fibres, can be used.

The reaction components are reacted by the single- or multistage process, which is known per se, use frequently being made of machinery. Details on processing equipment which is also suitable according to the invention are described in Kunststoffhandbuch [Plastics handbook], volume VII, published by Vieweg and Höchtlen, Carl-Hanser-Verlag, Munich, 1966. The reaction temperature of the respective mixtures according to the invention in the liquid-crystalline temperature range of one of the reaction components is important and, for example in the particularly preferred case of the (co)use of the diisocyanate (III), is in the temperature range 117–170° C. Depending on the choice of starting components and the catalysts and mixing machinery used, the curing times (reaction times for the formation of the polymer network) are between 1 minute and 24 hours.

For the preparation of polymeric networks, having superstructures, of the epoxy resin type, the following compounds are suitable as liquid-crystalline starting materials (a):

Usable 1,2-polyepoxide compounds can be polyglycidyl ethers of polyhydric phenols, for example made from catechol, resorcinol, hydroquinone, from 4,4'-dihydroxydiphenylmethane, from 4,4'-dihydroxy-3,3'-dimethyldiphenylmethane, from 4,4'-dihydroxydiphenyldimethylmethane, from 4,4'-dihydroxydiphenylcyclohexane, from 4,4'-dihydroxy-3,3'-dimethyldiphenylpropane, from 4,4'-dihydroxydiphenyl, from 4,4'-dihydroxydiphenyl sulphone, from tris-(4-hydroxyphenyl)-methane, from the chlorination and bromination products of the abovementioned diphenols, from novolaks (that is to say from products of the reaction of monohydric or polyhydric phenols with aldehydes, in particular formaldehyde, in the presence of acid catalysts), from diphenols which have been obtained by esterification of 2 moles of the sodium salt of an aromatic oxycarboxylic acid using one mole of a dihalogenoalkane or dihalogenodialkyl ether (GB-A No. 1,017,612), from polyphenols which have been obtained by condensation of phenols and long-chain halogenated paraffins containing at least two halogen atoms (cf. GB-A No. 1,024,288). The following may furthermore be mentioned: polyepoxide compounds based on aromatic amines and epichlorohydrin, for example N-di-(2,3-epoxypropyl)-aniline, N,N'-dimethyl-N,N'-diepoxypropyl-4,4'-diaminodiphenylmethane and N-diepoxypropyl-4-aminophenyl glycidyl ether (cf. GB-A No. 772,830 and GB-A No. 816,923).

In addition, the following are suitable: glycidyl esters of polyvalent aromatic, aliphatic and cycloaliphatic carboxylic acids, for example diglycidyl phthalate and diglycidyl adipate, and glycidyl esters of the products of the reaction of 1 mole of an aromatic or cycloaliphatic dicarboxylic acid anhydride and ½ mole of a diol or 1/n mole of a polyol having n hydroxyl groups, or diglycidyl hexahydrophthalates, which may optionally be substituted by methyl groups.

Glycidyl ethers of polyhydric alcohols, for example

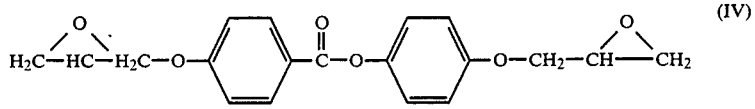

(IV)

The compound (IV) is new. Ihe preparation process is described in German Patent Application No. P (Le A 24 641) filed simultaneously.

Compound (IV) has a liquid-crystalline character (determined by quantitative DTA measurement). On heating compound (IV), melting, the solid→isotropic liquid transition, occurs at 118° C. On cooling, a liquid→nematic phase transition occurs at 93° C. and a nematic→solid transition occurs at 80° C.

Heat-curable epoxy-resin mixtures comprise, for example, at least one 1,2-polyepoxide having more than one 1,2-epoxide group per molecule, at least one cyclic carboxylic acid anhydride, or a diamine or polyamine, curing catalysts, and, if appropriate, further auxiliaries and additives.

However, for the preparation of polymeric networks having superstructures, blends of liquid-crystalline polyepoxides according to formula (I) with conventional polyepoxides, or any mixtures thereof, are also suitable, for example, as 1,2-polyepoxides, aliphatic, cycloaliphatic, aromatic or heterocyclic compounds which contain an average of more than one 1,2-epoxide group per molecule.

from 1,4-butanediol, 1,4-butenediol, glycerol, trimethylolpropane, pentaerythrite and polyethylene glycols, can likewise be used. Of further interest are triglycidyl isocyanurate, N,N'-diepoxypropyloxamide, polyglycidyl thioethers of polyhydric thiols, such as, for example, from bismercaptomethylbenzene, diglycidyltrimethylene trisulphone, and polyglycidyl ethers based on hydantoins.

Finally, epoxidation products of polyunsaturated compounds may be mentioned, such as vegetable oils and their reaction products, epoxidation products of diolefins and polyolefins, such as butadiene, vinylcyclohexene, 1,5-cyclooctadiene and 1,5,9-cyclododecatriene, polymers and copolymers which also contain epoxidizable double bonds, for example based on the polybutadiene, polyisoprene, butadiene/styrene copolymers, divinylbenzene, dicyclopentadiene and unsaturated polyesters, furthermore epoxidation products of olefins which are accessible by Diels-Alder addition and are subsequently converted into polyepoxides by epoxidation using a per compound or from compounds which contain two cyclopentene or cyclohexene rings linked via bridging atoms or groups of bridging atoms.

In addition, polymers of unsaturated monoepoxides, for example of glycidyl methacrylates or allyl glycidyl ethers, may be mentioned.

The following polyepoxide compounds, or mixtures thereof, are preferably co-used for the process according to the invention:

Polyglycidyl ethers of polyhydric phenols, in particular from bisphenol A; polyepoxide compounds based on aromatic amines, in particular bis-(N-epoxypropyl)-aniline, N,N'-dimethyl-N,N'-diepoxypropyl-4,4'-diaminodiphenylmethane and N-diepoxypropyl-4-amino-phenyl glycidyl ether; polyglycidyl esters made from cycloaliphatic dicarboxylic acids, in particular diglycidyl hexahydrophthalates and polyepoxides made from the product of the reaction of n moles of hexahydrophthalic anhydride and 1 mole of a polyol having n hydroxyl groups (n=integer from 2 to 6), in particular of 3 moles of hexadrophthalic anhydride and one mole of 1,1,1-trimethylolpropane, 3,4-epoxycyclohexylmethyl 3,4-epoxycyclohexane carboxylate.

Liquid polyepoxides, such as bis(N-epoxypropyl)-aniline or vinylcyclohexene diepoxide, may advantageously be used. In particular cases, this can further reduce the viscosity of already-liquid polyepoxides or convert solid polyepoxides into liquid mixtures.

Acyl anhydrides which can be used are common di- and polycarboxylic acid anhydrides. Liquid or low-melting dicarboxylic acid anhydrides, such as, for example, hexahydrophthalic anhydride, methylhexahydrophthalic anhydride, methyl-endomethylenetetrahydrophthalic anhydride, methyltetrahydrophthalic anhydride and tetrahydrophthalic anhydride are preferably used; of the latter two, the mixtures of isomers are particularly suitable.

Curing can be effected by mixing the 1,2-polyepoxide/carboxylic acid anhydride mixtures with known catalysts and, if appropriate, further additives, and heating to relatively high temperatures.

The mixing ratio is expediently selected so that about one anhydride group is present per 1,2-epoxide group; more or less anhydride (about 0.6 to 1.2 moles of anhydride groups per epoxide group) can also be used. It is also possible to use, in addition, further carboxylic acid anhydrides or curing agents.

The curing can be carried out at temperatures from about 60° C. to 250° C., preferably 80° C. to 180° C. It is important that the curing is carried out in the liquid-crystalline (nematic) temperature range of the liquid-crystalline polyepoxides employed. Thus, for example, an epoxy resin which contains component (IV) is cured in the temperature range from 93° to 80° C. by melting and homogenizing at 120° to 130° C. and subsequently cooling to 90° C.

The formation of the liquid-crystalline state can be recognized by the appearance of a milky/turbid mixture. Surprisingly, the cured epoxy-resin moulded parts retain this milky/turbid opaque character even when conditioning is carried out, even markedly above the liquid-crystalline range, for example at 150° C., after the curing reaction. However, if the liquid epoxy-resin mixtures which contain compound (IV) are cured from the start at 110° to 130° C. (that is to say in the isotropic temperature range) clear, transparent moulded articles are obtained. This makes it clear that polymeric networks, according to the invention, having superstructures have not been obtained in this case.

Curing can also be interrupted at any point in time by cooling, for example to room temperature, and can be continued at a later point in time. The point in time of the interruption of the reaction is expediently selected so that the mixture obtained on cooling (for example to room temperature is solid, and, on later heating to the temperature of the final curing, again becomes liquid or deformable under pressure. The use of this last mentioned process is particularly advantageous when suitable fields of application are laminated plastics, moulded plastics and coating materials, for example according to the whirl sintering process.

Fillers, such as quartz powder, chalk, aluminium oxide, pigments, such as titanium dioxide and iron oxide, organic pigments, such as phthalocyanin pigments, flexibilizers, such as polyglycols, polyether glycol, polyesters having terminal hydroxyl and/or carboxyl groups, polysulphides, soluble dyestuffs, reinforcing materials, such as, for example, glass fibres, woven fabrics or plasticizers, if appropriate as mixtures, can be added to the 1,2-polyepoxide resin material.

The materials according to the invention can be used as cured casting resins, for example as building and insulating materials, for example for insulators, transformers, condensers, printed circuits, laminated plastics, chemical pipes and containers, sports equipment, for boatbuilding, inter alia.

Depending on the area of application, epoxy-resin systems are also, however, cured using polyfunctional amines. The chemical structure of common industrial accelerators, the mechanisms of the curing reactions, the properties of the moulded parts obtained and the areas of application are described in detail in Polymere Werkstoffe [Polymeric materials], published by H. Batzer, vol. III, Technologie 2 [Technology 2], Georg Thieme Verlag, Stuttgart 1984, pp. 170 ff. These known, industrially common accelerators are cured as a blend with aromatic diamines of the formula (I) and polyepoxides of the formula (IV) to form epoxy-resin moulded parts comprising the polymeric networks having superstructures according to the invention when the curing reaction is carried out in the nematic LC region of the units.

Polyisocyanates and polyepoxides can be polyadded using suitable catalysts, to form polymeric networks havisocyanurate and oxazolidinone structures. Heat-curable reaction mixtures of this type and a process for the preparation of moulded articles using these mixtures are described, for example, in (hitherto unpublished) German Patent Application No. P-3,600,764.1 of 14.01.1986.

If, as starting components, the LC diepoxide corresponding to the formula (IV) and the LC diisocyanate of the formula (III) are used, for example, and this mixture is cured, using any state-of-the-art catalysts, in the LC region of the starting components, polymeric networks, having superstructures, according to the invention are likewise obtained. Here also, the LC character of the polymeric networks is demonstrated by the milky/turbid, opaque appearance of the moulded articles.

UP resins are solutions of unsaturated polyesters (A) in a vinyl monomer (B), usually styrene. They are cured by crosslinking copolymerization of the vinyl monomer with the polymerizable double bonds of the polyester. Monomeric base materials, polycondensation and curing are likewise described in "Polymere Werkstoffe" [Polymeric materials] (by H. Batzer, see above, pp. 123 ff.).

If part of the styrene is replaced by unsaturated LC units according to formula (I) and the curing reaction is carried out in the nematic region of the LC units, polymeric networks, having superstructures, according to the invention are obtained by copolymerization.

The formation of polymeric networks having superstructures is likewise possible by preparing polycondensates using compounds of the formulae (I) and/or (IA), crosslinked with styrene or a monomer which is customary for unsaturated polyester resins (H. Batzer, see above, pp. 123 ff.).

Suitable starting units for the preparation of LC UP resins are, for example, the following compounds: 4,4'-Dihydroxy-diphenyl derivatives of the formula

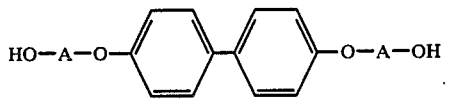

(A=a straight-chain or branched alkylene radical having 2 to 12 C atoms), preferably a straight-chain alkylene radical, for example

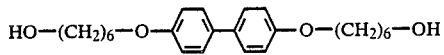

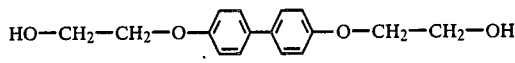

or diphenyl derivatives, such as

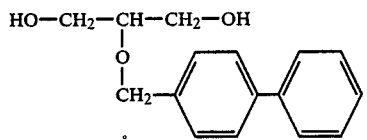

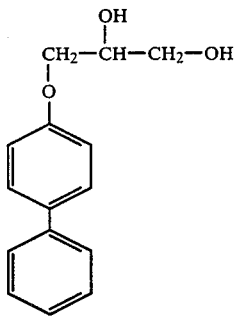

Blends of the liquid-crystalline UP resins with conventional UP resins are also suitable for the preparation of polymeric networks having superstructures.

Preferred α,β-unsaturated polyesters (A) are the conventional products of polycondensation of at least one α,β-ethylenically unsaturated dicarboxylic acid, generally having 4 or 5 C atoms, or the ester-forming derivatives thereof, for example the anhydrides thereof, if appropriate as a blend with up to 200 mol %, relative to the unsaturated acid components, of at least one aliphatic dicarboxylic acid having 4 to 10 C atoms or a saturated or unsaturated cycloaliphatic, araliphatic or aromatic dicarboxylic acid having 8 to 10 C atoms, or the ester-forming derivatives thereof, with at least one polyhydroxyl compound, in particular a dihydroxyl compound having 2 to 8 C atoms, that is to say polyesters as described in J. Bjorksten et al., "Polyesters and ther Applications", Reinhold Publishing Corp., New York 1956.

Examples of unsaturated dicarboxylic acids, or the derivatives thereof, which are preferably to be used are maleic acid or maleic anhydride and fumaric acid. However, mesaconic acid, citraconic acid, itaconic acid or chloromaleic acid, for example, can also be used. Examples of aliphatic, saturated or unsaturated cycloaliphatic, araliphatic or aromatic dicarboxylic acids to be used, if appropriate, or of the derivatives thereof are phthalic acid or phthalic anhydride, isophthalic acid, terephthalic acid, hexa- or tetrahydrophthalic acid, or the anhydrides thereof, endomethylenetetrahydrophthalic acid, or the anhydride thereof, succinic acid, succinic anhydride, succinates and succinyl chlorides, adipic acid and sebacic acid. In order to prepare non-flammable resins, hexachloroendomethylene-tetrahydrophthalic acid, tetrachlorophthalic acid or tetrabromophthalic acid, for example, can be used. Dihydric alcohols which can be employed are ethylene glycol, propane-1,2-diol, propane-1,3-diol, diethylene glycol, dipropylene glycol, butane-1,3-diol, butane-1,4-diol, neopentyl glycol, hexane-1,6-diol, 2,2-bis-(4-hydroxylcyclohexyl)-propane, 1,4-3,6-dianhydrohexitols, bisoxalkylated bisphenol A, perhydrobisphenol and others. Ethylene glycol, propane-1,2-diol, diethylene glycol and dipropylene glycol are preferably used.

Further modifications are possible by employing monohydric, trihydric or tetrahydric alcohols having 1 to 6 C atoms, such as methanol, ethanol, butanol, allyl alcohol, benzyl alcohol, cyclohexanol and tetrahydrofurfuryl alcohol, trimethylol propane, glycerol and pentaerythrite, mono-, di- and triallyl ethers and benzyl ethers of trihydric and polyhydric alcohols having 3 to 6 C atoms according to DE-B No. 1,024,654, for example trimethylolpropanediallyl ether, and by incorporating monobasic acids, such as benzoic acid or acrylic acid.

The unsaturated polyesters A can also be products of the Diels-Alder reaction of polyester precondensates and dienes, for example dicyclopentadiene. Such polyesters are described, for example, in I. R. Lawrence "Polyester Resins", Reinhold Publ. Corp. New York 1960, pp. 18 f. and in Kunststoff-Handbuch [Plastics handbook]vol. VIII ("Polyester" [Polyesters]), Carl Hanser Verlag, Munich 1973, pp. 247–312. The acid numbers of the polyesters are usually between 10 and 100, preferably between 20 and 70, the OH numbers are between 10 and 150, preferably between 20 and 100, and the molecular weights $M_n$ determined as average numbers, are between about 500 and 5,000, preferably between about 1,000 and 3,000 (measured by vapourpressure osmometry in dioxane and acetone; if the values vary, the lower is regarded as the correct value).

Suitable unsaturated monomers B which can be copolymerized with the unsaturated polyesters are unsaturated compounds which are customary in polyester technology and which preferably carry α-substituted vinyl or vinylidene groups or β-substituted allyl groups, preferably styrene; but also, for example, nuclear-chlorinated and nuclear-alkylated or alkenylated styrenes, where the alkyl groups can contain 1 to 4 carbon atoms, for example vinyltoluene, divinylbenzene, α-methylstyrene, tert.-butylstyrene and chlorostyrenes; vinyl esters of carboxylic acids having 2 to 6 carbon atoms, preferably vinyl acetate, vinyl propionate and vinyl benzoate; vinylpyridine, vinylnaphthalene, vinylcyclohexane, acrylic and methacrylic acid, and/or the esters thereof (preferably vinyl, allyl and methallyl esters) having 1 to 4 carbon atoms in the alcohol component, the amides and nitriles thereof, maleic anhydride, semiesters and diesters thereof having 1 to 4 carbon atoms in the alcohol component, semiamides and diamides thereof or cyclic imides, such as butyl acrylate, methyl methacrylate, acrylonitrile, N-methylmaleimide or N-cyclohexylmaleimide; allyl compounds, such as allylbenzene, and allyl esters, such as allyl acetate, diallyl phthalate, diallyl isophthalate, diallyl fumarate, allyl carbonates, diallyl carbonates, triallyl phosphate and triallyl cyanurate.

Polymeric networks, having superstructures, which are used as coating agents can be obtained by the new construction principle as follows:

A relatively low molecular weight polyester, having OH groups, with LC properties is obtained by esterifying 1,5-bis-(2-hydroxyethoxy)-naphthalene using adipic acid in the molar ratio 1.0:0.9. In differential thermoanalysis in the range from about 138° to 141° C., this ester has a distinct nematic phase transition before it is converted into the isotropic melt state at about 153° C.

Subsequent crosslinking by polycondensation with amino resin crosslinking agents or by polyaddition with polyfunctional isocyanates is possible by the terminal OH groups. If the crosslinking is carried out in the nematic temperature region, the coatings can be obtained with anisotropic properties.

Some of the large number of units, usable as components for coating polymers, of type (a) having a LC character are shown below: Diphenyl derivatives or hexahydrodiphenyl derivatives such as:

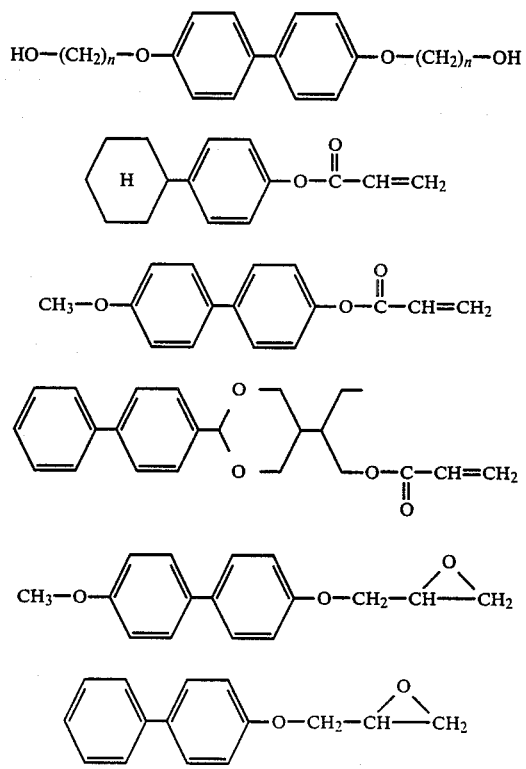

In principle, as shown by the above examples, substances which are suitable in the process according to the invention are those which offer, through their functional groups, the possibility of polycondensation, polyaddition or polymerization. During this, the LC component can be incorporated into the main or side chain.

Polycondensations, polymerizations and polyadditions for the preparation of coating polymers are generally known and are described, for example, in Houben-Weyl volume XIV/1, Makromolekulare Stoffe [Macromolecular substances], Georg Thieme Verlag, Stuttgart, 1961, pp. 6 and following. In addition, a large number of examples for the preparation of coating polymers is contained in "Lehrbuch der Lacke und Beschichtungen" [Textbook of paints and coatings], W. Kittel, Verlag W.A. Colomb, Stuttgart, and in the book "Lackkunstharze" [Synthetic paint resins] by Wagner and Sarx, Carl Haeser Verlag, Munich 1971.

The amino resins used as crosslinking agents are melamin/formaldehyde or urea/formaldehyde condensation products. Melamin resins are all conventional melamin/formaldehyde condensates which are not etherified or are etherified with saturated monoalcohols having 1 to 4 C atoms, as described, for example, in FR-A No. 943,411 or in D. H. Solomon, The Chemistry of Organic Filmformers, 235–240, John Wiley & Sons, Inc., New York, 1967. However, melamin resins can also be replaced, entirely or partly, by other crosslinking amino plastics, such as described, for example, in "Methoden der Organischen Chemie" [Methods of organic chemistry] (Houben-Weyl), vol. 14/2, part 2, 4th edition, George Thieme Verlag, Stuttgart, 1963, 319 ff.

All polymeric networks, having superstructures, according to the invention are distinguished by their opaque appearance, by a great hardness with simultaneous presence of good elasticity, and by high heat resistance.

EXAMPLES

Preparation of liquid-crystalline units (a) (Examples 1 to 3)

EXAMPLE 1

4-Hydroxy-phenyl 4-hydroxy-benzoate (V)
Batch
414 g (3 mol) of 4-hydroxybenzoic acid
330 g (3 mol) of hydroquinone
1,800 ml (about 1.56 kg) of xylene
6 g of boric acid
4.5 ml (about 8.2 g) of concentrated sulphuric acid A mixture of the reaction components is heated to the reflux temperature with vigorous stirring in a 3-liter sulphonation beaker which is equipped with a flat-flange cover, internal thermometer, V$_2$A steel stirrer and—via a water separator—a reflux condenser, and which is located in an oil bath (with immersion heater and contact thermometer). After stirring for about 3.5 hours at the reflux temperature, the removal of the water produced by the reaction (about 55 to 56 ml; theoretically 54 ml) is ended. The mixture is stirred for a further 0.5 hours at the reflux temperature and then allowed to cool to room temperature—if possible with further stirring. The crude product, subsequently rapidly filtered off under suction, is washed with xylene and dried at room temperature under reduced pressure.

The powdered material is first washed thoroughly with 3% strength sodium hydrogen carbonate solution and then with water, and dried at room temperature under reduced pressure.

Yield: 680 g (98.5% of theory)

Melting point: 242° to 245° C.

For further purification, (V) is extracted to exhaustion from the crude product with hot acetone, (V) is precipitated from the extraction mixture, which has been cooled to room temperature, by adding ice water with stirring, rapidly filtered off under suction and dried over silica gel at room temperature under reduced pressure. After recrystallizing from glycol momethyl ether acetate, pure (V) of melting point: 241° to 243° C. is obtained in 87% yield (600 g).

The new preparation process for this substance is claimed in a German Patent Application No. P 36 22 611 filed simultaneously.

EXAMPLE 2 p-Epoxypropoxyphenyl p-epoxypropoxybenzoate (IV)

Batch 2,775 g (30 mol) of epichlorohydrin
4 g of tetraethylammonium chloride
230 g (1 mol) of 4-hydroxyphenyl-4-hydroxybenzoate (V)
222 g (2.5 mol) of 45% strength NaOH The epichlorohydrin, the 4-hydroxyphenyl-4-hydroxybenzoate (V) and the tetraethylammonium chloride are reacted for 16 hours at 60° C. under N₂ in a 4-liter 3-neck flask equipped with internal thermometer, stirrer and—via a water separator—a reflux condenser. The subsequent dehydrohalogenation is carried out within 6 hours at 130 mbar and 60° C. by continuous dropwise addition of the aqueous NaOH. During the reaction, the water is removed continuously via the water separator.

When the NaOH addition is complete, the mixture is stirred for a further 3 hours under the same conditions. The sodium chloride is subsequently filtered off and washed with fresh epichlorohydrin, and the combined filtrates are concentrated at 18 mbar and a bath temperature of 50° C. The epichlorohydrin removed by distillation is reused for the next batch. The residue is dissolved in 200 ml of acetonitrile and, after addition of 1 liter of methanol, brought to crystallization. The crystals are filtered off under suction, washed with methanol and dried in vacuo at room temperature over silica gel.

Yield: 242 g (71% of theory) melting point: 105°–107° C. After recrystallizing twice from acetonitrile/isopropanol (1:1), the melting point increased to 118° C. (DTA)

Quantitative differential thermal analysis (DTA) and polarized-light microscopic measurements show that compound IV, on cooling from the melt, is converted into the nematic state at 93° C. and into the solid state at 80° C.

DTA measurement, Mettler TA 2000 instrument, quantitative measuring cells, aluminium crucible, preliminary measurement: 2 K/min.

Polarized-light microscopic measurement, Mettler FP 5 instrument, magnification 60×, crossed polarizing filters.

This new substance and the preparation thereof is claimed in a German Patent Application No. P 36 22 610 filed simultaneously.

EXAMPLE 3 p-Aminophenyl p-aminobenzoate (APAB) was prepared according to DE-B No. 1,085,869, but with the difference that the hydrogenation of p-nitrophenyl p-nitrobenzoate (IX) was not carried out in methanol, but instead in dimethylformamide (yield >90% of theory).

The phosgenation of (APAB) to form 4'-isocyanatophenyl 4-isocyanatobenzoate (III) is likewise carried out according to DE-B No. 1,085,869.

Compound (III) was investigated for liquid-crystalline character using the instruments described in Example 2.

DTA measurement (III) melts on heating to 117.2° C. and exhibits a solid→nematic transition, and exhibits a nematic→isotropic liquid transition at 172.6° C.

On cooling, the isotropic liquid→nematic transition occurs at 172° C. and the nematic→solid transition at 102° C.

Polarized-light microscopic measurement (III) melts on heating at 117.5° C. and exhibits a solid→nematic transition, and exhibits at nematic→isotropic liquid transition at 172.1° C.

On cooling, the isotropic liquid→nematic transition occurs at 172.5° C., and the nematic→solid transition at 101.1° C.

EXAMPLE 4

Build-up of a polymeric network having superstructures by polyaddition by the diisocyanate polyaddition process 320 g (0.1575 mol) of a linear polypropylene glycol, molecular weight 2,000, 35 g (0.166 mol) of a trifunctional polyether, molecular weight 3,000 (made from trimethylolpropane and propylene oxide) and 30.5 g (0.125 mol) of a diamine chain extender of the following formula

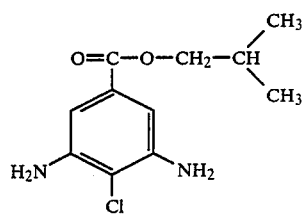

are mixed and dehydrated for 1 hour at 120° C. at 18 mbar (component A).

98 g of the LC diisocyanate (III) (4'-isocyanatophenyl 4-isocyanatobenzoate) of Example 3 are melted at 130° C. An opaque melt is produced. The opaque melt is then stirred into the mixture (component A), prewarmed to 120° C., with stirring and under nitrogen (NCO characteristic No. 117). The mixture is degassed by evacuating the apparatus and is poured directly into a prewarmed (120° C.) 18×19×0.4 cm mould. The polyaddition and crosslinking reactions are then completed at 120° C. in a heating cabinet (24 hours).

In this fashion, an opaque plate of a physically and chemically crosslinked polyurethane polyurea having superstructures is obtained.

For comparison, a polyurethane polyurea was prepared from the same polyols, the same chain extender and 4,4'-diphenylmethane diisocyanate. A transparent plate of a polyurethane polyurea without superstructures is produced.

The elastomer according to the invention was tested according to DIN 53 504 and DIN 53 515 against the elastomer made from conventional units.

| Tensile test according to DIN 53 504 | | According to the invention | Comparison |
|---|---|---|---|
| Tensile strength [MPa] | −20° C. | 39.3 | 28.4 |
| | +22° C. | 14.8 | 11.4 |
| | +70° C. | 5.51 | 2.31 |
| Elongation at tear [%] | −20° C. | 340 | 336 |
| | +22° C. | 460 | 412 |
| | +70° C. | 396.8 | 70 |
| Hardness [Shore A/D] | +22° C. | 65/18 | 70/20 |
| Elasticity [%] | +22° C. | 33 | 29 |
| Compression set according to DIN 53 515 [%] | 70 h/+23° C. | 6.8 | 20.0 |
| | 24 h/+70° C. | 26.6 | 36.1 |

EXAMPLE 5

Preparation of epoxy resins by curing p-epoxypropoxyphenyl p-epoxybenzoate (IV) with p-aminophenyl p-aminobenzoate (APAB)

The diamine (APAB), in the amount ratios specified in the tables, is dissolved in the bisepoxide (IV) at 135° to 140° C., and crosslinking is initiated by conditioning at various temperatures.

TABLE 1

| Experiment No. | Bisepoxide (IV) [g] | Diamine (APAB) [g] | Conditioning 1 | | Conditioning 2 | | Properties |
|---|---|---|---|---|---|---|---|
| | | | Temp. [°C.] | Time [h] | Temp. [°C.] | Time [h] | |
| (1)+ | 6.8 | 2.3 | 110 | 24 | — | — | transparent |
| 2 | 6.8 | 2.3 | 90 | 24 | 120 | 24 | opaque |
| 3 | 6.8 | 2.3 | 90 | 24 | 150 | 24 | opaque |
| 4 | 6.8 | 2.3 | 90 | 24 | 150 | 24 | opaque |
| 5 | 6.8 | 2.3 | 90 | 24 | 200 | 24 | opaque |
| 6 | 20.4 | 6.9 | 90 | 24 | 120 | 24 | viscoplastic, opaque plate |
| (7)+ | 100.0 | 32.0 | 130 | 2.5 | 160 | 16 | transparent |
| 8 | 100.0 | 32.0 | 90 | 2.5 | 160 | 16 | opaque |

( )+ not according to the invention

Table 1 makes it clear that, on hardening the epoxy resin in the isotropic temperature range (Experiments No. 1 and 7), transparent moulded elements are obtained (networks without superstructures), whereas, on hardening in the nematic temperature range (Experiments 2 to 6 and 8), opaque moulded elements are obtained (networks with superstructures). Experiments Nos. 2 to 6 and 8 furthermore show that networks with superstructures, once formed, cannot be converted into networks without structures by subsequent conditioning at elevated temperatures.

TABLE 2

| Properties of the epoxy-resin moulded parts from Experiment 7 and 8 | | |
|---|---|---|
| | Experiment 7 | Experiment 8 |
| Flectional strength [MPa] | 91 | 112 |
| Outer fibre strain [%] | 4.8 | 6.7 |
| Toughness [kJ/m²] | 32 | 43 |
| Marten temperature [°C.] | 174 | 174 |

Table 2 makes it clear that the mechanical properties of epoxy resins having superstructures are improved by an average of about 30% compared to epoxy resins hardened in the isotropic temperature range.

EXAMPLE 6

80 g of 4-isocyanato-phenyl 4-isocyanatobenzoate (III) (from Example 3) and 20 g of p-epoxypropoxyphenyl p-epoxypropoxybenzoate (IV) (from Example 2) are mixed at 135° to 140° C., 1 g of the salt produced from dimethylbenzylamine and dibutylphosphoric acid is added as catalyst, and the mixture is poured into a mould and cured for 24 hours at 90° C. The post-curing is carried out for 24 hours at 180° C. and subsequently for a further 24 hours at 200° C. In this fashion, an opaque, viscoplastic, polymeric isocyanurate/oxazolidinone network having superstructures is obtained.

EXAMPLE 7

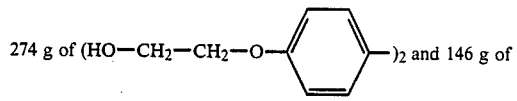

274 g of (HO—CH₂—CH₂—O—⟨⟩—)₂ and 146 g of adipic acid are melted at 155° C. and condensed at 200° C. until an acid number of 75 mg of KOH/g is produced. After adding 51.6 g of maleic anhydride at 120° C., the mixture is kept at this temperature for a further 2 hours. The solid UP resin is examined under a polarized-light microscope. The following transitions are detected:

Solid→nematic 80° C.

Nematic→isotropic 137° C.

EXAMPLE 8

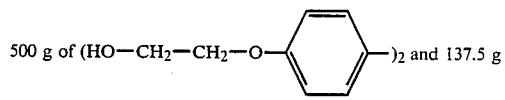

500 g of (HO—CH₂—CH₂—O—⟨⟩—)₂ and 137.5 g of fumaric acid are heated to 210° C. in 1 hour and kept at this temperature until H₂O is no longer eliminated. Stabilization is effected using 0.018 g of hydroquinone paste. A UP resin of a marbly consistency is obtained and is examined by polarized-light microscopy and differential scanning calorimetry (DSC). Polarized-light microscope:

Nematic→isotropic liquid transition 191.5° C. Differential scanning calorimetry:

1st transition 143.9° C.

2nd transition 172° C.

Nematic→isotropic 190.5° C.

The unsaturated polyesters, having superstructures, from Example 7 and 8 can be crosslinked by free radicals, as described in the general part, with unsaturated monomers to form polymeric networks having superstructures if the polymerization is carried out in the nematic region of the unsaturated polyester resins.

We claim:

1. Process for the preparation of polymeric networks having superstructures, characterized in that (a) functional units having a liquid-crystalline character, are reacted with (b) functional, preferably polyfunctional, units, with or without a liquid-crystalline character, by the polymerization, polyaddition or polycondensation processes within the liquid-crystalline, the temperature range of the (poly)functional units having a liquid-crystalline character and used for building up the polymeric networks with build-up to form the polymer, and, are post-cured at temperatures outside the liquid-crystalline range.

2. Process for the preparation of polymeric networks, having superstructures, according to claim 1, characterized in that the functional, units (a) employed having a liquid-crystalline characteristic, are compounds of the general formula (I)

$$R_1—(A_1)_m—Z_1—A_2—Z_2—(A_3)_n—R_2 \qquad (I)$$

where $R_1$ and $R_2$ denote

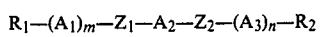

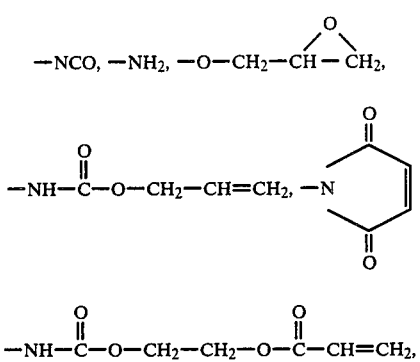

—L—(CH$_2$)$_x$OH, —L—(CH$_2$)$_x$—CO$_2$H, L=O, S, a direct bond, —(CH$_2$)$_x$—OH or —(CH$_2$)$_x$—CO$_2$H, x≧1, $A_1$, $A_2$ and $A_3$ denote 1,4-phenylene, 4,4'-diphenyl, 4,4'-(1,2,3,4,5,6-hexahydro)-diphenyl, 1,4-cyclohexylene, 1,3-dioxane-2,5-diyl, piperidine-1,4-diyl, piperazine-1,4-diyl, 1,4-bicyclo-(2,2,2)-octylene, pyrimidine-2,5-diyl, or 2,7- or 2,6-naphthylene groups, where $A_1$–$A_3$ can be substituted by 1, 2, 3 or 4 F atoms or lower alkyl groups or 1 or 2 substituents from the series comprising Cl, Br, —CN or —CF$_3$;

$Z_1$ and $Z_2$ denote —CO—O—, —O—CO—, —HC=CH—, —N=N—, —CH=N—, —CH$_2$CH$_2$—, —OCH$_2$, —CH$_2$O—, —CH$_2$S—, —SCH$_2$—, —O—CO—O—, —O—CO—NH—, —NH—CO—O—, —CH$_2$—O—CO—NH—, —NH—CO—O—CH$_2$—, —NH—CO—S—CH$_2$, —CH$_2$—S—CO—NH—, —CH$_2$—O—CO—, —NH—CO—S—, —S—CO—NH—, —CO—S—, —CO—SCH$_2$—, CH$_2$—S—CO—, —S—CO—, —CO—O—CH$_2$— or a direct bond, where one of the groups $Z_1$ and $Z_2$ can be missing n denotes 0 or 1, and m denotes 1 or 2, where, in the case where m is 2, the two groups $A_1$ may be identical or different, compounds of the general formula (IA)

$$\begin{array}{c}(CO_2H)/HO—(CH_2)_x—CH—(CH_2)_y—OH/(CO_2H) \\ | \\ (CH_2)_z \\ | \\ (A_1)_m \\ | \\ Z_1 \\ | \\ A_2 \\ | \\ Z_2 \\ | \\ (A_3)_n \\ | \\ Y\end{array} \qquad (IA)$$

where x, y and z÷1, and where $A_1$, $A_2$, $A_3$, $Z_1$, $Z_2$, m and n correspond to the abovementioned meanings and Y denotes H or $R_1$, or the oligomeric or low-molecular weight, linear reaction products thereof having functional groups.

3. Process according to claim 1 and characterized in that the functional, units (a), having a liquid-crystalline character, are polyisocyanates of the general formula (II)

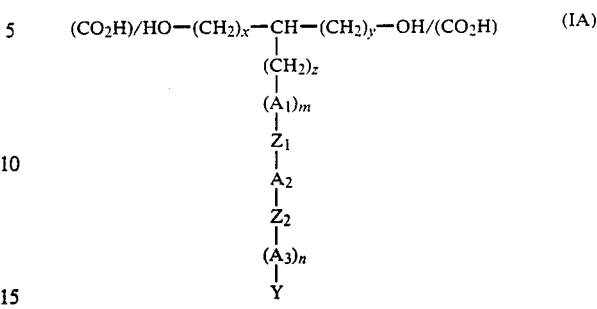

where

M denotes —HC=CH—, —N=N—, —CH=N—, —COO— or —CH$_2$—CH$_2$— and $R_3$ to $R_6$ denote hydrogen or saturated aliphatic substituents, having 1 to 12 C atoms, which are optionally interrupted by ether oxygen atoms, lower alkyl groups, preferably methyl groups in symmetrical substitution, or F, Cl, Br —CN or CF$_3$, very particularly the liquid-crystalline diisocyanate (III),

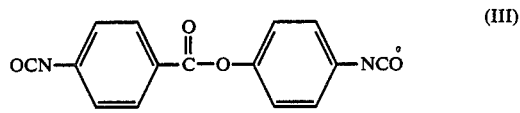

and/or polyepoxides of the formula (IIa) having one or more 1,2-epoxide groups per molecule

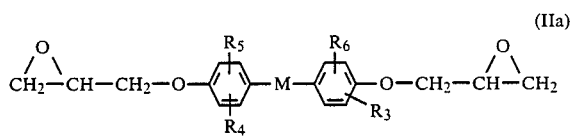

where M and $R_3$ to $R_6$ have the abovementioned meaning, in particular the bisepoxide (IV)

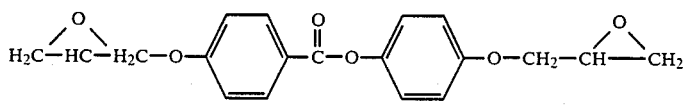

and the monoepoxides

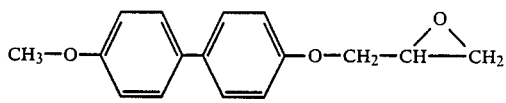 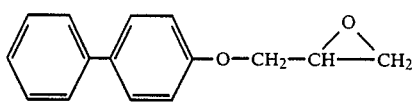

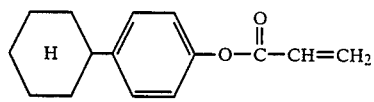

-continued

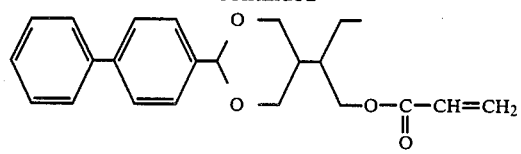

or

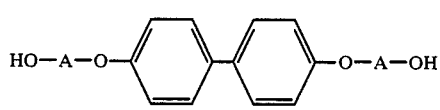

and 4,4-dihydroxy-diphenyl derivatives of the general formula

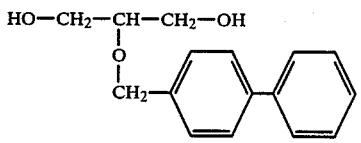

(wherein A is a straight-chain or branched alkylene radical having 2 to 12 C atoms), or diphenyl and/or hexahydrodiphenyl derivatives of the formulae

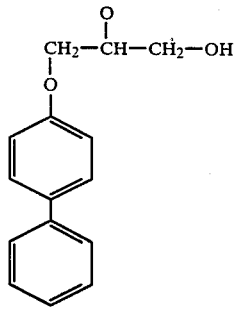

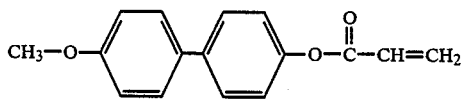

4. Polymeric networks having superstructures, obtainable according to claim 1 by polyaddition or polymerization or polycondensation of
  (a) functional, units having a liquid-crystalline character, with
  (b) functional, units with or without a liquid-crystalline character, within the liquid-crystalline, temperature range of the (poly)functional units having a liquid-crystalline character and used for building up the networks, with build-up to form polymers, and, conditioning outside the liquid-crystalline range.

5. Polymeric networks, having superstructures, according to claim 4, characterized in that they are polyaddition plastics produced by the diisocyanate polyaddition process.

6. Polymeric networks, having superstructures, according to claim 4, characterized in that they are polyaddition plastics of the epoxy-resin type.

7. Polymeric networks, having superstructures, according to claim 4, characterized in that they are polymerization plastics of the unsaturated polyesterresin type.

8. Polymeric plastics, having superstructures, according to claim 4, characterized in that they are polycondensation plastics of the melamin or phenol resin type.

9. Molded articles for coating agents which comprise polymers having superstructures according to claim 4.

* * * * *